United States Patent Office 3,496,232
Patented Feb. 17, 1970

3,496,232
PREPARATION OF PROPARGYL AMINES
Robert J. Tedeschi, Whitehouse Station, and George L.
Moore, South Plainfield, N.J., assignors to Air Reduction Company, Incorporated, New York, N.Y., a corporation of New York
No Drawing. Filed June 29, 1967, Ser. No. 649,845
Int. Cl. C07c 33/04, 29/00
U.S. Cl. 260—583   6 Claims

ABSTRACT OF THE DISCLOSURE

A propargyl amine is prepared by reacting an amine and pearaformaldehyde with liquefied acetylene.

---

This invention relates to the preparation of acetylenic amines and is more particularly concerned with the preparation of propargyl alkyl amines.

It has heretofore been proposed to react an amine with acetylene and with a paraformaldehyde compound to produce a propargyl amine. In general this process can be represented by the following formula

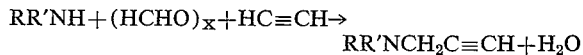

In the above formula R and R' are alkyl groups and $(HCHO)_x$ is paraformaldehyde. Such a process is described in Moore et al. U.S. Patent 3,268,524. This reaction requires carefully controlled addition of the amine to minimize by-product formation, and even with great care some by-products are produced. At the same time the application of heat is necessary in order to achieve a reasonable reaction rate.

It is an object of this invention to provide a process for preparing propargyl alkyl amines which can be carried out at low temperatures and which does not require the above-mentioned controlled addition of the amine. It is a further object of the invention to provide a process of the character indicated which produces the desired propargyl alkyl amine with little or no by-product formation.

In accordance with the invention, a dialkyl amine is reacted with paraformaldehyde and liquefied acetylene in the presence of a suitable catalyst of the type disclosed in Moore et al. U.S. Patent 3,268,524. It has been found that by using liquefied acetylene reaction readily occurs at room temperature and below, and no particular care is required in adding the amine. In addition, the desired propargyl alkyl amine is produced with essentially no by-product formation.

The amine suitably used in accordance with the invention has the formula RR'NH, wherein R and R' are the same or different alkyl groups containing up to 20 carbon atoms, preferably lower alkyl groups, i.e. containing from 1 to 7 carbon atoms.

The acetylene may be used in previously liquefied form or it may be liquefied or "condensed" in the reaction vessel by introducing it under pressure into the cooled vessel so that the acetylene is brought below its critical temperature.

As catalysts suitable for carrying out the above reactions may be mentioned the heavy metals of subgroups I–B and II–B of the Periodic Table of elements and their compounds, as, for example, organic and inorganic salts of copper, such as the chloride, acetate, formate, and so forth. Also may be mentioned the acetylides of such heavy metals, for example, acetylene-copper compounds. Other catalysts, such as Adkins catalyst, i.e., copper-barium chromite, may also be used. Among the catalysts, the copper salts, and more particularly the cupric salts, are especially suitable. Particularly good results are obtained with cupric chloride, and this material is preferred.

The catalyst or mixtures thereof may, if desired, be used with suitable inert carriers, such as, for example, finely-divided alumina, diatomaceous earth, silica, silica gel, kieselguhr, and mixtures of the foregoing.

While an inert solvent may be used, it is one of the features of the invention that no added solvent is required. When an added solvent is employed, it should be a non-polar solvent which is inert both to the starting materials and to the reaction products and it is readily volatilizable Saturated or unsaturated hydrocarbons which are liquid at atmospheric conditions are especially suitable, such as the alkanes, e.g. hexane. Preferred for use are alkanes having at least 5 carbon atoms.

The preferred method of contacting the reactants involves adding the aldehyde and the catalyst to the reaction vessel, introducing the acetylene, and then adding the amine to the resulting environment. For the best results, the amine should be added incrementally during the course of the reaction but carefully control of the addition is not necessary. The molar ratio of amine to aldehyde may vary between about 0.80 and 1.20:1 and is preferably between about 1.0 and 1.10:1. A molar ratio of amine to paraformaldehyde of between about 1.0 and 1.10:1 is preferred, and a molar ratio of about 1.05:1 is optimum, the molar ratios being based on HCHO, i.e. the above-described molar ratios are based upon moles of equivalent aldehyde and not moles of the polymer.

The reaction is carried out under anhydrous conditions, at least at the beginning. Any suitable dehydrating agent which is inert to reactants and to the products of reaction may be used to take up the water produced by the reaction. Such dehydrating agents are well understood in the art. As a typical example may be mentioned anhydrous sodium sulfate.

The temperature and pressure of reaction should be high enough to cause reaction to occur, but below the temperature and pressure at which tar and undesirable side products and by-products form. The temperature of reaction may vary between about 0° C. and 50° C., or higher, and is preferably between about 0° C. and 25° C. Although the reaction may be carried out at pressures between about 350 and 1000 p.s.i.g., reaction pressures of between about 375 to 550 p.s.i.g. are especially advantageous, and are preferred.

The liquid acetylene used in accordance with this invention can be readily prepared by introducing compressed gaseous acetylene into a cooled vessel from a gas cylinder or other source. Ordinary cylinders of acetylene are at a pressure of about 250 p.s.i.g. when full. The acetylene can be used directly from the cylinder but preferably the pressure of the acetylene is increased to about 400 p.s.i.g. before the liquefaction step by introducing the acetylene into a pressure vessel or accumulator and pumping mineral oil into the bottom of the vessel until the desired acetylene pressure is obtained. As previously mentioned, the liquefaction of the acetylene is most readily effected in the autoclave or other vessel in which the reaction of the invention is to be carried out. Thus, the compressed gaseous acetylene is introduced into the reaction vessel which is suitably cooled to a sufficiently low temperature to cause liquefaction of the acetylene. By using vapor pressure-temperature and density-temperature data such as found in V. J. Clancey, "Liquid and Solid Acetylene: A Review of Published Information" (England); Explosives Research and Development Establishment Survey 1/5/51, 1952, and in S. A. Miller, "Acetylene," Academic Press, pp. 506–516 (1965), the temperature needed for liquefaction of acetylene at a given acetylene pressure can be readily ascertained. In general, with an acetylene pressure of about 400 p.s.i.g., a temperature of −10 to −30° C. is sufficient to allow rapid liquefaction of the acetylene. Cooling of the reaction vessel, which is, of course, supplied with appropriate cooling coils or a cooling jacket, is readily achieved by means of any suitable cooling medium, and a particularly effective cooling medium is methanol which has been cooled by circulation through coils immersed in secondary butanol, or a mixture of ethylene glycol and methanol, containing pieces of solid carbon dioxide (Dry Ice). Heating of the reaction vessel is easily effected by circulating the methanol through a body of warm water.

The invention will be more fully understood from the following examples, which, although illustrative, are not intended to limit the scope of the invention, except as such limitations may apppear in the claims. In the examples, all parts are by weight unless otherwise indicated.

EXAMPLE 1

The apparatus employed was a 125 ml. stainless steel, high-pressure autoclave, which was equipped with an inner coil and jacket cooling and a suitable stirrer. The autoclave was dried by warming to about 50° C. and sweeping with $N_2$ prior to adding the reactants. Paraformaldehyde (6.3 g., 0.2 mole HCHO) and cupric chloride (1.0 g.) were placed in the autoclave. Efficient cooling was effected by the use of a 2–3 gallon reservoir of ethylene glycol-methanol (1:1) in which a copper cooling coil was immersed. Copper lines from the coil exposed to the atmosphere and leading to the autoclave were insulated with fiber glass and vinyl tape. The methanol cooling liquid in the system was circulated by means of a pump. By continual introduction of small pieces of solid carbon dioxide into the reservoir a temperature of −40° C. was readily reached.

After cooling to about −30° C., acetylene was condensed in the autoclave (50 cc. of liquid, 1.0 mole). The stirrer was turned on at this point. Then the mixture was warmed slowly to about 0° C. over a period of 1.5 hours. The temperature was gradually increased to about 25° C. and during this period a total of 0.2 mole of dimethyl amine was continuously added. The mixture was then stirred 2 hours at about room temperature. Pressure was maintained in the range of 380–530 p.s.i.g.

The reaction product mixture was taken up in hexane and filtered. A small aqueous layer separated and the filtrate contained propargyl dimethyl amine in an amount representing a conversion of 58%.

EXAMPLE 2

Using apparatus such as employed in Example 1, paraformaldehyde (6.3 g., 0.2 mole HCHO), 1 g. cupric chloride and 7.5 cc. hexane were placed in the reactor.

The reactor was then cooled to about −30° C. and acetylene was condensed in the autoclave (50 cc. of liquid, 1.0 mole). The stirrer was turned on and the procedure described in Example 1 was followed, with 0.2 mole of dimethyl amine being added.

The reaction product mixture was then worked up as described in Example 1. The propargyl dimethyl amine produced represented a conversion of about 58%.

EXAMPLE 3

Operating as described in Example 1, paraformaldehyde (6.3 g., 0.2 mole HCHO) and 1.0 g. cupric chloride were placed in the reactor. The reactor was then cooled to about −30° C. and acetylene was condensed in it (50 cc. of liquid, 1.0 mole). The stirrer was turned on and the mixture was warmed slowly to about 2° C. Over a period of 1.5 hours, the temperature was gradually increased to about 26° C. and during this period 0.2 mole of diethyl amine was continuously added. The mixture was stirred 1.5 hours at room temperature. Pressure was maintained in the range of 378–540 p.s.i.g.

After working up the mixture as described in Example 1, the propargyl diethyl amine represented a conversion of about 44%.

The products of this invention are generally known and are useful as corrosion inhibitors.

We claim:
1. The process of producing propargyl amines which comprises reacting an amine of the formula

RR′NH wherein R and R′ are the same or different alkyl groups containing up to 20 carbon atoms with paraformaldehyde and liquefied acetylene at a temperature sufficient for reaction up to about 50° C.

2. The process of producing propargyl amines as defined in claim 1, wherein the reaction is carried out at a temperature between about 0° C. and 50° C.

3. The process of producing propargyl amines as defined in claim 1, wherein the molar ratio of amine to aldehyde is between about 0.80 and 1.20:1.

4. The process of producing propargyl amines as defined in claim 1, wherein at least the beginning of the reaction is carried out under anhydrous conditions.

5. The process of producing propargyl amines as defined in claim 1, wherein the reaction is carried out in the presence of a catalyst which is a heavy metal of subgroups I–B and II–B of the Periodic Table or its compounds.

6. The process of producing propargyl amines which comprises reacting an amine of the formula

RR′NH wherein R and R′ are the same or different alkyl groups containing up to 20 carbon atoms with paraformaldehyde and liquefied acetylene at a temperature between about 0° C. and 50° C. with a molar ratio of amine to aldehyde between about 0.80 to 1.20:1 and at least at the beginning under anhydrous conditions in the presence of a catalyst which is a heavy metal of subgroups I–B and II–B of the Periodic Table or its compounds.

References Cited

UNITED STATES PATENTS 3,268,583   8/1966   Moore et al.

CHARLES B. PARKER, Primary Examiner

R. L. RAYMOND, Assistant Examiner

U.S. Cl. X.R.

252—390

UNITED STATES PATENT OFFICE
CERTIFICATE OF CORRECTION

Patent No. 3,496,232    Dated February 17, 1970

Inventor(s) Robert J. Tedeschi and George L. Moore

It is certified that error appears in the above-identified patent and that said Letters Patent are hereby corrected as shown below:

Col. 2, line 11, there should be a period (.) at the end of the line after the word "volatilizable";

line 21, the word "carefully" should read -- careful --.

Col. 4, line 49, the word "to" should read -- and --.

SIGNED AND
SEALED
AUG 25 1970

(SEAL)
Attest:

Edward M. Fletcher, Jr.
Attesting Officer

WILLIAM E. SCHUYLER, JR.
Commissioner of Patents